Sept. 26, 1961   W. L. LOCKETT   3,001,725
HOSE NOZZLE
Filed May 8, 1958

INVENTOR:
WILLIAM L. LOCKETT
BY Marzall, Johnston,
Cook + Root
ATT'YS

United States Patent Office 3,001,725
Patented Sept. 26, 1961

3,001,725
HOSE NOZZLE
William L. Lockett, Downers Grove, Ill., assignor to W. D. Allen Manufacturing Co., Chicago, Ill., a corporation of Illinois
Filed May 8, 1958, Ser. No. 733,960
1 Claim. (Cl. 239—458)

This invention relates in general to hose nozzles, and more particularly to the type of hose nozzles employed in connection with garden hose, and still more particularly to an adjustable hose nozzle having means enabling quick adjustment operation.

Heretofore, mere knurling of the rotatable member of an adjustable hose nozzle has served for providing a surface to be gripped for the purpose of preventing slippage. While knurling is generally satisfactory when the hose nozzle is dry, the element of slippage increases when the rotatable portion of the nozzle becomes wet.

Accordingly, it is an object of this invention to obviate the above difficulty and provide an improved hose nozzle having an adjustable member which can be easily gripped when wet.

Another object of this invention resides in the provision of an adjustable hose nozzle, wherein the adjustable member is provided with means to insure positive gripping action for adjustments.

Still another object of this invention is in the provision of a hose nozzle having an inner member and an outer member relatively adjustable to vary the discharge of the nozzle, wherein a plastic sleeve is carried on the outer member for the purpose of enhancing the gripping thereof for adjustment purposes.

A further object of this invention is to provide an adjustable hose nozzle having relatively rotatable parts, wherein the part normally to be rotated relative to the other part has mounted thereon a plastic sleeve with an outer roughened surface for enhancing the gripping of the rotatable part when the hose nozzle is wet.

A still further object of this invention is to provide an adjustable hose nozzle having an inner tubular member telescopically receiving an outer tubular member, threaded means on the members whereby relative rotation therebetween effects relative axial movement therebetween, a pair of axially spaced rings on the outer member and knurling arranged between said rings, and a plastic sleeve received on the outer member between the spaced rings, whereby the plastic sleeve has its outer surface roughened and serves to enhance the gripping of the outer tubular member for adjustment purposes.

Another object of this invention is the provision of an adjustable hose nozzle including an inner tubular member and an outer tubular member relatively rotatable and axially movable therealong, and a plastic sleeve on the outer member which gives sure grip for quick adjustment from fine sprays to drenching streams to leakproof shutoff.

Still another object of this invention is to provide an adjustable hose nozzle including an inner metal tubular member and an outer metal tubular member rotatable and axially movable therealong, and a plastic sleeve on the outer member which insulates the hand of the user from the metal members.

Other objects, features, and advantages of the invention will be apparent from the following detailed disclosure, taken in conjunction with the accompanying sheet of drawing, wherein like reference numerals refer to like parts, in which.

Figure 1:
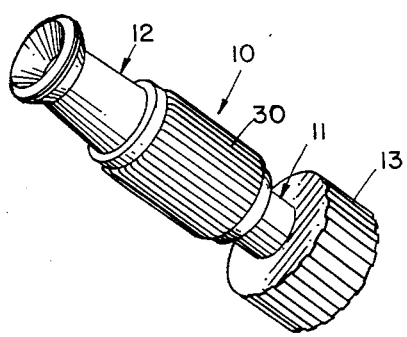
FIG. 1 is a perspective view of the hose nozzle embodying the invention.
Figure 2:
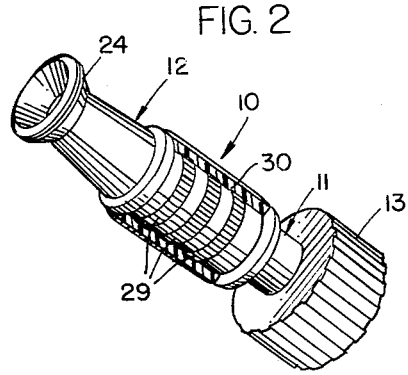
FIG. 2 is a perspective view similar to FIG. 1, but having parts removed to show underlying parts and other parts in section.
Figure 3:
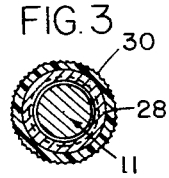
FIG. 3 is a transverse sectional view, taken substantially along line 3—3 of FIG. 5.
Figure 4:
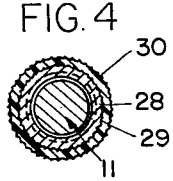
FIG. 4 is a transverse sectional view, taken substantially along line 4—4 of FIG. 5.
Figure 5:
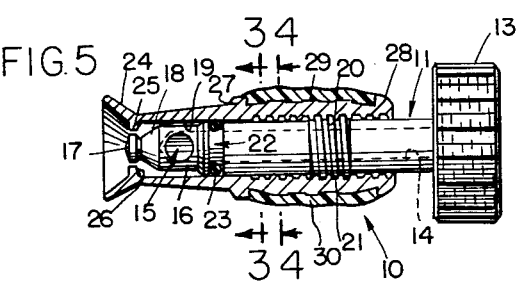
FIG. 5 is a longitudinal sectional view taken through the hose nozzle, with some parts shown in elevation.
Figure 6:
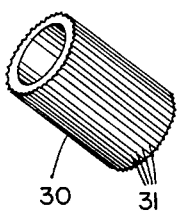
FIG. 6 is a perspective view of the plastic sleeve mounted on the outer rotatable member.

The adjustable hose nozzle of the present invention is generally adapted to be used in connection with garden hose, although it may be used for any other suitable purpose. Referring to the drawing, the hose nozzle, generally designated by the numeral 10, includes generally an inner tubular member 11 and an outer tubular member 12. These members are machined from a non-corrosive metal, preferably brass.

The inner tubular member 11 includes a hose coupling nut or member 13 mounted on one end thereof for facilitating connection to a hose or the like, and a longitudinal fluid bore 14 extending through the member and communicating with a transversely extending bore 15 adjacent the other end and formed in a diametrically reduced portion 16. The diametrically reduced portion 16 may be defined as the spray stem and includes at its outer end a head 17 and spaced inwardly slightly therefrom a conically formed valving surface 18.

The outer tubular member 12 is provided with a longitudinal bore 19 threaded at 20 to engage external threading 21 on the inner member 11, whereby relative rotation between the members effects axial movement therebetween. In order to prevent leakage along the inner member and the threaded portions, an annular groove 22 is formed on the inner member to receive a neoprene O ring gasket 23, which seals along the bore 19 of the outer member.

At the outer end of the outer member 12, a flared discharge or outlet portion 24 is provided to effect a conical stream when the spray stem head 17 is properly adjusted relative thereto. A shutoff ring or valve seat 25 is provided at the inner end of the outlet portion 24 and has a conical seat portion 26 which mates with the conical portion 18 of the inner member for shutoff purposes. Thus, when the outer member 12 has been rotated and moved longitudinally along the inner member 11 so that the valving surface 18 engages the seat portion 26 of the shutoff ring 25, the liquid will be trapped from being discharged out of the nozzle. The outer tubular member 12 may be adjusted along the inner tubular member 11 in order to effect fine sprays, drenching streams, or leakproof shutoff.

A pair of axially spaced annular flanges or retaining rings 27 and 28 are formed on the outer surface of the outer tubular member 12 in spaced axial relationship. Between these rings, knurling 29 is provided. A plastic sleeve 30 encircles the outer tubular member 12 and has its opposite ends arranged between the axially spaced rings 27 and 28. The outer surface of the plastic sleeve is roughened by providing circumferentially spaced and longitudinally extending ridges or projections 31 thereon. The knurling, engaging the inner diameter of the plastic sleeve, prevents relative rotation between the outer tubular member 12 and the plastic sleeve 30. The plastic sleeve 30, which may be of any color, having its outer surface roughened, serves to assure positive gripping even if the plastic sleeve is wet, whereby quick adjustment from fine sprays to drenching streams to leakproof shutoff can be easily made. The plastic sleeve may be formed by cutting it from a length of plastic hose, which makes it economical to manufacture. The plastic sleeve may also be molded by any known process if desired and then applied to the outer member, or it may be molded directly onto the outer member. In assembling, the plastic sleeve will be stretched slightly and forced over one end of the outer member until its ends are received between the axially spaced rings 27 and 28.

The longitudinally extending ridges 31 on the outer surface of the plastic sleeve 30, forming the gripping surface of the outer member, although sharp, are less apt to cut one's hands than the same type of gripping surface on a metal machined surface. Further, the plastic sleeve serves to insulate the hand of the user from the metal parts of the nozzle when either a hot or cold fluid is passed through the nozzle.

It will be understood that modifications and variations may be effected without departing from the scope of the novel concepts of the present invention, but it is understood that this application is to be limited only by the scope of the appended claim.

This invention is claimed as follows:

In an adjustable garden hose nozzle, an inner tubular member having a hose coupling member on one end and a spray stem on the other end, an outer tubular member telescopically and rotatably carried on said inner member and having a portion coacting with the spray stem for regulating the discharge stream, said members having threaded means whereby relative rotation thereof causes relative axial movement thereof, said outer tubular member having an elongated annular recess, said recess including a cylindrical bottom and longitudinally spaced, opposed radial faces integral with said outer tubular member, an elongated resilient plastic sleeve tightly fitted in said recess, the opposite ends of said sleeve abutting the opposed radial faces of said recess, said sleeve having generally longitudinally extending and circumferentially spaced ridges on the outer face thereof, and knurling extending around said cylindrical bottom of said recess for inhibiting relative rotation between the plastic sleeve and the outer member.

References Cited in the file of this patent

UNITED STATES PATENTS

| | | |
|---|---|---|
| 623,128 | Bartlett | Apr. 18, 1899 |
| 708,537 | Esch | Sept. 9, 1902 |
| 1,917,216 | Bersted | July 11, 1933 |
| 2,623,790 | Smith | Dec. 30, 1952 |
| 2,627,439 | Wornall | Feb. 3, 1953 |
| 2,684,268 | Hjulian | July 20, 1954 |
| 2,783,094 | Storie | Feb. 26, 1957 |
| 2,789,865 | Shannon | Apr. 23, 1958 |